United States Patent [19]

Schlicht

[11] 4,235,730

[45] Nov. 25, 1980

[54] POLYURETHANES AND USE THEREOF IN LUBRICANTS AND FUELS

[75] Inventor: Raymond C. Schlicht, Fishkill, N.Y.

[73] Assignee: Texaco Inc., White Plains, N.Y.

[21] Appl. No.: 973,837

[22] Filed: Dec. 28, 1978

[51] Int. Cl.$^3$ .......................... C10M 1/36; C08K 5/01; C08G 18/68
[52] U.S. Cl. .............................. 252/51.5 A; 252/46.7; 528/73; 528/75; 528/82; 528/83; 260/33.6 UB; 44/62; 44/70
[58] Field of Search .......................... 252/51.5 A, 46.7; 528/75, 82, 73, 83

[56] References Cited

U.S. PATENT DOCUMENTS

| | | | |
|---|---|---|---|
| 3,573,205 | 3/1971 | Lowe et al. | 252/51.5 A |
| 3,850,826 | 11/1974 | de Vries | 252/51.5 A |
| 3,950,341 | 4/1976 | Okamoto | 252/46.7 |
| 4,028,258 | 6/1977 | Kablaoui et al. | 252/46.7 |

*Primary Examiner*—H. S. Cockeram
*Attorney, Agent, or Firm*—Carl G. Ries; Robert A. Kulason; James F. Young

[57] ABSTRACT

A polyurethane which is a reaction product of a diisocyanate and a diol. The polyurethane product is useful as a dispersant for lubricants and fuels. The product can be further defined as the product of an ester, amide or ester amide derivative of alkenyl-or alkenyl-substituted dibasic acids which reaction product contains hydroxy alkyl groups.

46 Claims, No Drawings

POLYURETHANES AND USE THEREOF IN LUBRICANTS AND FUELS

BACKGROUND OF THE INVENTION

1. Field of the Invention

This invention relates to novel polyurethane compositions derived from the reaction of diisocyanate and a particular class of polyols, e.g., diols. More especially, this invention relates to the use of such novel polyurethanes as dispersants for lubricants and fuels. More especially, this invention relates to lubricant and/or fuel compositions containing, as dispersants, the novel polyurethane condensation polymers of the invention.

2. Discussion of the Prior Art

Numerous lubricant oil dispersants are known for use in motor oil compositions. Many of these dispersants are in the form of large organic chemistry molecules possessing a variety of functional groups. For instance, in U.S. Pat. No. 3,573,205, there is disclosed lubricant compositions which are the reaction products of diisocyanates and alkenylsuccinimides of polyalkylene amines. These reaction products can be represented by the following formula

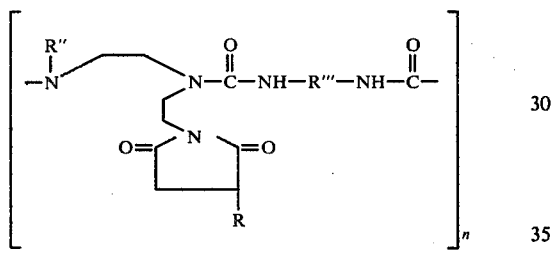

Thus, the condensation polymers are characterized by urea functions which are formed by the reaction of the diisocyanate with a primary or secondary amino group, the alkenylsuccinyl group being pendant to the polymer chain.

Other dispersants for use with lubricants are disclosed in U.S. Pat. No. 3,850,826, which discloses the preparation of polyamides as an initial step by high temperature condensation reaction of amines bearing two secondary amine groups with an alkenylsuccinic anhydride group. The polyamide is thereafter reacted with the diisocyanate, whereby the terminal secondary amino group of the polyamide reacts with the diisocyanate to form a polymer via the formation of urea moieties.

Neither of these prior art dispersants are characterized by urethane or ester functions in the product.

In the continuing quest to provide new and improved polymeric dispersants for lubricants and/or fuels, it became desirable to provide a lubricant and/or fuel dispersant which contained urethane groups. More especially, it became desirable to provide such an improved urethane-containing polymer which would pass the rigorous standards required of modernday lubricant and/or fuel dispersants. Still moreover, it became desirable to provide a novel backbone for the polyurethane polymers, which backbone could be supplied by a wide variety of organic chemicals containing any one of a number of functional groups. Specifically, it became desirable to provide a polyurethane polymer of relatively low molecular weight and good dispersancy containing, pendant from the polymeric chain, an alkyl or alkenyl moiety of substantial chain length and a moiety within the polymer chain itself composed of an alkylene or arylene moiety having 2 to 20 carbon atoms, optionally containing inert functional groups such as tertiary amino groups. These and other objects are accomplished in accordance with the present invention, which is discussed below.

SUMMARY OF THE INVENTION

Broadly, this invention contemplates a polyurethane which is the reaction product of an isocyanate and a diol of the formula

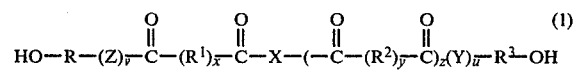

wherein
each of R, $R^1$, $R^2$ and $R^3$ is independently a divalent aliphatic or aromatic moiety;
u, v, x, y, and z are each independently 0 or 1 and x+y=1 or 2;
X is a radical derived from removal of hydrogen atoms from a compound of the formula H—X—H wherein said H—X—H compound is:
  a. a diamine or polyamine bearing at least 2 secondary amino groups, optionally containing any number of tertiary amine or other functional groups inert to anhydrides, hydroxyalkylating agents and isocyanates;
  b. a monohydroxy alkyl secondary amine optionally bearing tertiary amine or other functions inert to anhydrides, hydroxyalkylating agents and isocyanates;
  c. a bis-hydroxyalkyl substituted mono-, di- or poly-tertiary amine; or
X is -O-$R^4$-O moiety wherein $R^4$ is a $C_2$ to $C_{30}$ divalent hydrocarbon radical, especially arylene or alkylene, or an oxa-alkylene moiety having 1 to 15 oxygen atoms;
Y and Z are each O or $NR^5$ wherein $R^5$ is a $C_1$ to $C_{30}$ alkyl group which can be substituted with cyano, $C_1$-$C_{32}$ carbalkoxy or $C_1$-$C_{32}$ carboxamido or other substituent inert to anhydrides, hydroxyalkylating agents and isocyanates.

The present invention further contemplates a lubricating oil composition comprising a lubricating oil and the aforesaid polyurethane, especially a lubricating oil composition comprising said polyurethane in an amount of between 0.1 and 20 weight percent, especially between 1 and 10 weight percent.

A further embodiment of the present invention comprises a fuel composition, which composition comprises a fuel and the herein described polyurethane, especially a fuel composition containing said polyurethane in an amount of between 0.0002 and 0.05 weight percent, preferably between 0.002 and 0.01 weight percent. Fuels in which the polyurethane can be employed as dispersant include gasolines, diesel fuels, jet fuels and heating oils.

Generally speaking, when the polyurethane is employed in a lubricant composition, the same is employed in an amount between 0.5 and 15 percent by weight. Concentrates of a lubricant oil and polyurethane are also contemplated, wherein the polyurethane is present in a lubricating oil-containing composition in an amount of 25 to 80 percent by weight.

The polyurethane of the present invention has a molecular weight, determined by vapor phase osmometry, of between 1,000 and 30,000, preferably between 5,000 and 10,000. The molecular weight will, of course, depend upon the particular polyol which is condensed with the isocyanate. The polyurethanes are generally ones of relatively low molecular weight and, hence, have a lower degree of polymerization. Generally speaking, there are at least three polymeric repeating units in the polyurethane, preferably between 3 and 25 repeating units, and most preferably between 5 and 12 polymeric repeating units.

As evident from the formula set forth above with respect to the polyol, a wide variety of carbonyl-containing polyols can be used for the condensation. Referring to the formula, each of the moieties R, $R^1$, $R^2$, and $R^3$ is a divalent aliphatic or aromatic moiety. Particularly contemplated are divalent hydrocarbon moieties, especially moieties of between 2 and 500 carbon atoms, preferably between 2 and 100 carbon atoms. Where any of these groups are in aliphatic moiety, it is preferred that they be an alkylene moiety. Where the same are an aromatic moiety, it is preferred that the aromatic moiety have between 6 and 16 carbocyclic carbon atoms, preferably between 6 and 10 carbocyclic carbon atoms therein.

Referring to the definition of the moiety X, the same can be a radial derived from removal of one or more terminal hydrogen atoms of a compound H—X—H, where the hydrogen atoms are bonded to hetero atoms such as N, O, S. Contemplated within this broad definition are radicals derived from aromatic and heterocyclic nitrogen, oxygen and sulfur compounds of between 4 and 16 carbocyclic carbon atoms, as well as aliphatic, especially alkylene and alkenylene compounds of 2 to 500 carbon atoms, the compound H—X—H being in the form of a $C_2$ to $C_{500}$ diamine, aminoalcohol, diol, similar thiol-bearing compounds, or polyfunctional analog of the preceding. The term "alkenylene" is employed herein to refer to a divalent radical formed by removal of terminal hydrogen atoms from an olefin. Stated differently, the term is employed interchangeably with "divalent alkenyl radical," it being understood that the radical contains at least one carbon to carbon double bond.

X can be a divalent alkylene, alkenylene, alkynylene, cycloalkylene or cycloalkenylene group terminated by hetero atoms, especially ones having 2 to 30 carbon atoms. Where X possesses a heterocyclic radical, it is preferred that the same have between 4 and 16 heterocyclic carbon atoms and that the hetero atom be nitrogen, oxygen or sulfur. The radical can contain two or more terminal hetero atoms and such atoms can be the same or different. In particular, there is contemplated the following types of compounds: di-secondary amines, hydroxyalkyl secondary amines, bis-hydroxyalkyl tertiary amines, mercaptoalkyl and mixed mercapto and hydroxy analogs of the previous two types, and related compounds of all of the above which additionally possess tertiary amino, oxygen, or sulfur atoms in the chain, or other inert functional groups.

The compound H-X-H can be selected from the group consisting of piperazine, $C_1$ to $C_{30}$ alkylene or arylene-bispiperazines, similar polyalkylene polypiperazines, N,N'-bis-$C_1$ to $C_{30}$ alkyl, $C_2$ to $C_{30}$ alkylenediamines, e.g., N,N'-bis-$C_1$ to $C_{30}$ alkylethylenediamines, N,N'-bis-$C_1$ to $C_{30}$ alkylphenylenediamines and N,N'-bis-cyanoethyl $C_2$ to $C_{30}$ alkylenediamines.

Where the compound H-X-H is a diamine or polyamine, the same has preferably between 1 and 10 carbon atoms per nitrogen atom and can have the radicals discussed supra. Optionally, the diamine or polyamine can contain any number of tertiary amines or other functional groups inert to anhydrides, hydroxyalkylating agents and isocyanates. Where the compound H—X—H represents a polyamine, the same has a molecular weight of between 100 and 500, determined by various methods, including osmometry, functional group analysis, and vapor phase chromatographic separation of mixtures.

The compound H—X—H can also represent a monohydroxyalkyl secondary amine optionally bearing a tertiary amine or other function inert to an anhydride, hydroxyalkylating agent or isocyanate. When said compound represents such a monohydroxyalkyl secondary amine, the same preferably has between 2 and 30 carbon atoms in the alkyl group. Particularly contemplated secondary amines of this type are those of the formulae:

$$R^9-N-R^6-OH, \quad R^9-N-R^6-N-R^7-OH, \text{ or}$$
$$\phantom{R^9-N-}H \phantom{-R^6-OH, R^9-}H \phantom{-R^6-}R^9$$

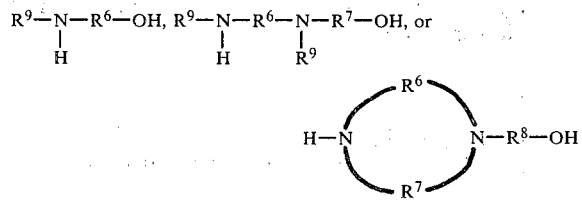

wherein
$R^6$, $R^7$, and $R^8$ are $C_2$ to $C_{30}$ alkylene groups, which R groups may differ independently when more than one is present,
$R^9$ is an alkyl group of 1 to 30 carbon atoms, an alkenyl group of 3 to 30 carbon atoms or an alkynyl group of 3 to 30 carbon atoms or an aryl group of 6 to 16 carbocyclic carbon atoms,
which amine can be substituted by one of the following substituents: cyano, tertiary amino, carbalkoxy or carboxamido and alkyl- or arylsulfonyl.

Particularly contemplated monohydroxyalkyl secondary amines are N-methyl-, N-ethyl-, N-butyl-, and N-cyanoethyl-ethanolamines, N-hydroxyethyl-N'-methyl-ethylenediamine, N-hydroxyethyl-N'-cyanoethyl-ethylenediamine, and N-hydroxyethylpiperazine.

When the compound H-X-H is a bis-hydroxyalkyl substituted mono-, di-, or poly-tertiary amine, the same preferably has 2 to 6 carbon atoms in the alkyl group. The other groups on the nitrogen atoms can be $C_1$ to $C_{30}$ alkyl, $C_3$ to $C_{30}$ alkenyl, $C_3$ to $C_{30}$ alkynyl or $C_4$ to $C_{16}$ carbocyclic aromatic or heterocyclic radicals where the hetero atom of the heterocyclic radical is oxygen, nitrogen or sulfur. Preferably, when the compound H-X-H is a tertiary amine, the same is a tertiary amine of an aliphatic compound, especially one wherein the aliphatic portion of the molecule is a hydrocarbyl group, notably one of the alkyl, alkenyl or alkynyl radicals discussed supra. Particularly contemplated bis-hydroxyalkyl substituted mono-, di-, or poly-tertiary amines are mono-, di-, or poly-tertiary amines selected from the group consisting of: bis-hydroxyethyl-, bis-3-hydroxypropyl, bis-2-hydroxypropyl-, bis-(1-hydroxy-2-propyl)-monoamines further substituted on the nitrogen atom by methyl, ethyl, butyl, phenyl, and cyanoethyl groups, and N,N'-bis-hydroxyethylpiperazine.

A number of different types of bis-hydroxyalkyl substituted mono-, di-, or poly-tertiary amines are contemplated including those having the formula

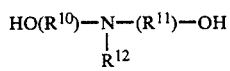

wherein
$R^{10}$ and $R^{11}$ are independently divalent hydrocarbon groups of 2 to 30 carbon atoms and
$R^{12}$ is an alkyl groups of 1 to 30 carbon atoms or an aryl group having 6 to 16 carbocyclic carbon atoms.

Preferably, $R^{10}$ and $R^{11}$ are independently alkylene groups and
$R^{12}$ is a $C_1$ to $C_{20}$ alkyl group or an aryl group having 6 to 10 carbon atoms.

When said compound H—X—H is a bis-hydroxyalkyl substituted mono-, di-, or poly-tertiary amine, it can be one having the formulae

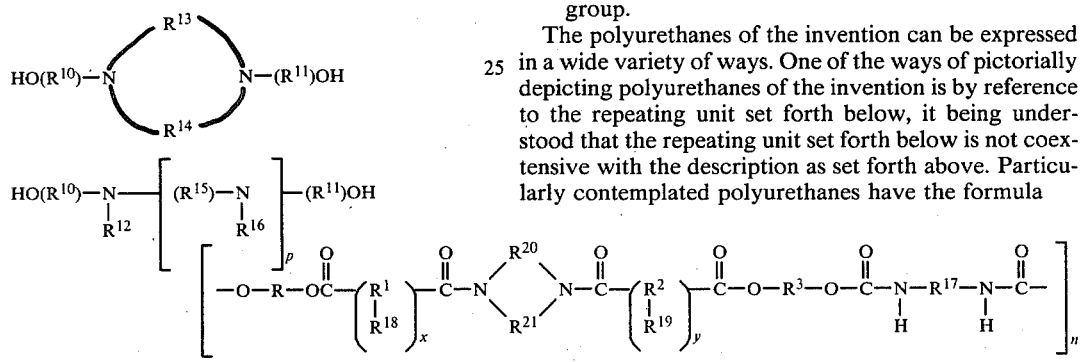

wherein
$R^{10}$, $R^{11}$ and $R^{12}$ are the same as previously described above;
$R^{13}$, $R^{14}$, and $R^{15}$ are defined in the same manner as $R^{10}$ and $R^{11}$, but are independently chosen;
$R^{16}$ is an alkyl or aryl radical which can be mono substituted by the independently chosen functions cyano, tertiary amino, carbalkoxy or carboxamido, and
p = 1 to 10.

Preferably, $R^{16}$ is alkyl of 1 to 30 carbon atoms or aryl of 6 to 16 carbocyclic carbon atoms.

Referring to the formula for the polyol given on page 4, it is preferred that the moieties R and $R^3$ each independently represent substituted or unsubstituted alkylene groups of 2 to 30 carbon atoms. When substituted, these moieties can be substituted by any one of the following groups: cyano, tertiary amino, carbalkoxy, or carboxamido.

Referring once again to the generic formula for the polyols, it is preferred that $R^1$ and $R^2$ each independently represent an alkylene group of 2 to 20 carbon atoms or an arylene group of 6 to 16 carbocyclic carbon atoms, either or both of which groups can be substituted or unsubstituted. When substituted, these groups can be substituted by any one of the following groups: $C_1$ to $C_{500}$ linear alkyl or alkenyl groups or $C_3$ to $C_{500}$ branched alkyl or alkenyl groups and may be further substituted by the inert functional groups listed above for groups R and $R^3$.

The isocyanates which can be reacted with the polyols to form the polyurethanes include those isocyanates of the formula

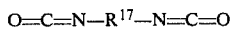

wherein
$R^{17}$ is arylene, polyarylene, arylene of at least 2 arylene nuclei where at least 2 arylene nuclei are linked together through an oxygen, nitrogen or sulfur atom, mixed alkylene-arylene, alkylene and polyalkylene and the thioanalogs of such diisocyanates. Where $R^{17}$ is a cyclic group such as an arylene, polyarylene or arylene group containing 2 arylene nuclei joined together through an oxygen, nitrogen or sulfur atom, the same preferably has 6 to 16 carbocyclic carbon atoms in each arylene nucleus.
If the same contains any alkyl or alkylene substituents, the chain preferably contains 1 to 30 linear or branched carbon atoms of the alkyl or alkylene group.

The polyurethanes of the invention can be expressed in a wide variety of ways. One of the ways of pictorially depicting polyurethanes of the invention is by reference to the repeating unit set forth below, it being understood that the repeating unit set forth below is not coextensive with the description as set forth above. Particularly contemplated polyurethanes have the formula

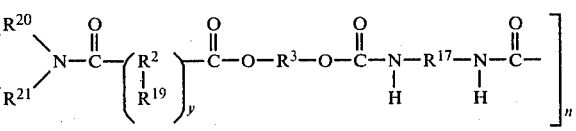

wherein
R, $R^1$, $R^2$, $R^3$, and $R^{17}$ have the meanings given above,
x and y are independently 0 or 1, and x+y = 1 or 2,
$R^{18}$ and $R^{19}$ are each independently alkyl or alkenyl of 12 to 500 carbon atoms,
$R^{20}$ and $R^{21}$ are each divalent arylene of 6 to 16 carbocyclic carbon atoms, alkylene or alkenylene groups of 2 to 30 carbon atoms in the chain, and
n = 2 to 30.

In the formula, each of $R^{18}$ and $R^{19}$ is preferably an alkyl or alkenyl group of 12 to 30 carbon atoms. $R^{18}$ and $R^{19}$ can be derived from low molecular weight polymers such as polybutenes, polypropylenes and copolymers of ethylene and propylene.

Particularly contemplated diols for conversion into polyurethanes are those having the formula

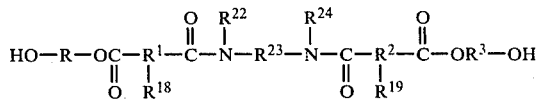

wherein
R, $R^1$, $R^2$, $R^3$, $R^{18}$, and $R^{19}$ have the meanings given above;
$R^{22}$ and $R^{24}$ are independently alkyl, alkoxyalkyl or aryloxyalkyl, cyanoalkyl, carboalkoxyalkyl, carboxamidoalkyl or other alkyl groups substituted by a group inert to anhydrides, hydroxyalkylating agents and isocyanates; and $R^{23}$ is a divalent alkylene, alkenylene or arylene group, especially an alkylene or alkenylene group of 2 to 30 carbon atoms or an arylene group of 6 to 16 carbocyclic carbon atoms.

$R^{22}$ and $R^{24}$ preferably are any one of the enumerated groups where the alkyl group has between 2 and 20 carbon atoms and can broadly be independently $C_{1-30}$ alkyl, $C_{1-30}$ alkoxyalkyl, $C_{6-30}$ aryloxyalkyl, $C_{1-30}$ cyanoalkyl, $C_{1-4}$ carboalkoxyalkyl, $C_{6-30}$ carboxamidoalkyl, and other alkyl group substituted by a group inert to anhydrides, hydroxyalkylating agents and isocyanates.

Other polyols useful to form polyurethanes are those of the formula

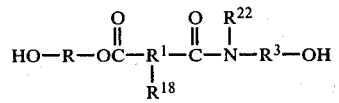

wherein

R, $R^1$, $R^3$, $R^{18}$, and $R^{22}$ have the meanings set forth above.

Other contemplated polyols for use in formation of the urethanes include those of the formula

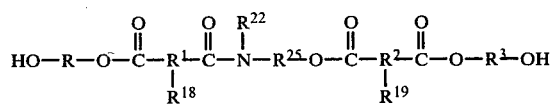

wherein

R, $R^1$, $R^2$, $R^3$, $R^{18}$, $R^{19}$, and $R^{22}$ have the meanings set forth above, and $R^{25}$ is an alkylene or arylene moiety of 2 to 20 carbon atoms which can be substituted by a moiety inert to anhydrides, hydroxyalkylating agents or isocyanates.

Other polyols useful in accordance with the invention are those having the formula

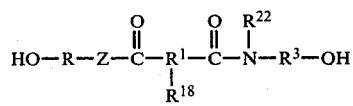

wherein

R, $R^1$, $R^3$, $R^{18}$, $R^{22}$, and Z have the meanings expressed above.

Still a further type of polyol useful as a precursor to form a polyurethane is representable by the formula

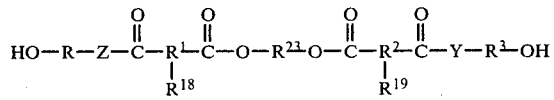

wherein

R, $R^1$, $R^2$, $R^3$, $R^{18}$, $R^{19}$, $R^{23}$, Y and Z have the meanings given above.

The moiety X, as set forth in the generic formula (I) expressed above for diols useful in accordance with the invention, can be the group —O—$R^4$—O—, especially when u and v are each 1 and Y and Z independently represent an oxygen atom or the moiety —N[$R^5$]—. Where X is present in the form of a —O—$R^4$—O moiety, it is preferred that the $R^4$ group be a $C_6$ to $C_{16}$ arylene group or an alkylene group of 2 to 30 carbon carbon atoms, or an oxa-alkylene group having 2 to 30 carbon atoms and 1 to 15 oxygen atoms. $R^5$ is $C_{1-30}$ alkyl, preferably $C_{1-4}$ alkyl which can be substituted by a group inert to anhydrides, hydroxyalkylating agents and isocyanates.

The polyurethane polymers of the invention, useful as dispersants for lubricants or fuels, are prepared by the reaction of isocyanates, especially diisocyanates, with bis- (or greater) hydroxyalkyl substituted alkenylsuccinamic acids, bis-amides, amide-esters, polyamides (especially the low molecular weight type), polyamide-esters (especially the low molecular weight type), and esters or polyesters bearing tertiary amino groups, especially lower molecular weight type esters or polyesters. Generally speaking, the diisocyanate is reacted with a compound of molecular weight between 300 and 3,000. This molecular weight is due to the molecular weight of the alkenylsuccinic acid or anhydride employed in the preparation of the diol intermediate and the mol ratios of other reactants to the alkenylsuccinamic acid or anhydride.

The final urethane bond formation completes the desired polymerization. The following equation exemplifies the manner by which urethane bonds are formed, using a typical dihydric alcohol reactant contemplated by the invention.

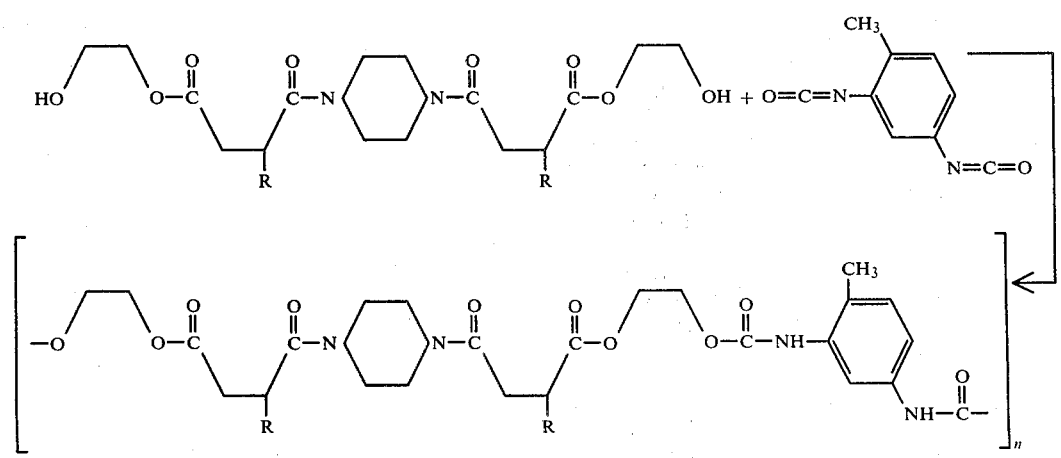

The end groups of the product are hydroxyl and/or isocyanate groups. The terminal moieties can additionally posses ester, amide, and/or urethane bonds. The product is a linear polymer and, in the case of the one exemplified, has an alkenylsuccinyl group as a component of the polymer chain.

It has been found that by the simple expedient of converting the polyol into the corresponding urethane, that quite surprisingly, notwithstanding the fact that the product is a polymer of substantially greater molecular weight than the monomer, the resultant polymerized product has substantially superior dispersant qualities to the low molecular weight intermediates. Hence, it is theorized that the enhanced dispersancy is due to the nature of the polymeric chain and the presence of amide or amino groups as well as the urethane function.

The skilled artisan will recognize that the formation of polyurethanes occurs independent of the nature of the amide or amino group present in the backbone of the dihydric alcohol reactant. It will also be noted that the nitrogen-containing moiety in the backbone of the compound can be joined directly through its nitrogen atom to a carbonyl group or it can be joined through another organic moiety, especially one which is an alkylene or arylene moiety having 2 to 20 carbon atoms which can possess other inert functions such as a tertiary amino group. If alkylene, the chain can contain one or more oxygen or sulfur atoms in the chain. If arylene, aromatic nuclei can be joined through an oxygen or sulfur bridge. More will be said about this below in connection with the description of the preparation of dihydric alcohols for conversion into polyurethanes. It should also be noticed that the nitrogen atom in the backbone of the polyhydric alcohol can have bonded thereto a moiety, represented by groups such as $R^5$, $R^{22}$, and $R^{24}$ in the various formulae set forth supra, whereby the nitrogen atom becomes a tertiary nitrogen atom. The polyhydric alcohol reactants can contain one or more amide or ester functions derived from an anhydride.

Also, polymeric analogs of the various structures set forth above for the useful polyhydric alcohols, e.g., polyamides, polyesters, poly(ester-amides) which have hydroxyalkyl groups at their termini, can be used in accordance with the invention, especially those polyamides, polyesters or poly(ester-amides) having a molecular weight of between 1,000 and 20,000, preferably between 1,000 and 10,000, determined by the reactant ratios used in the preparation and by end-group analysis.

Amino compounds employed in the invention include:

1. Di- or polyaliphatic or aromatic amines bearing at least two secondary amino groups and any number of tertiary amino or other functions inert towards anhydrides, hydroxyalkylating agents or isocyanates;

2. Monohydroxyalkyl secondary amines which may also bear other inert functions; and 3. Bis-hydroxyalkyl substituted mono-, di-, or polytertiary amines, as discussed supra. Examples of such compounds include piperazine, N,N'-bis-methyl or ethyl ethylenediamine or other alkylene diamines, N,N'-bis-alkylphenylenediamines, N,N'-bis-(cyanoethyl) ethylene and other alkylene, e.g., $C_3$ to $C_{20}$ diamines, N-hydroxyethyl (-propyl, -butyl, or other lower alkyl or aryl) amines, N,N'-bis-hydroxyethyl or other lower alkyl or aryl amines, and N,N'-bis-hydroxyethyl or other lower alkyl piperazines.

The isocyanates useful for reaction are those which are essentially free of mono- and tri-isocyanate impurities, although the same can be present in an amount of 5 percent or less. Those particularly contemplated include commerical diisocyanates such as toluene, methylene-bis-phenyl, hexamethylene and polyethyleneglycol diisocyanates.

In order to prepare the polyurethane, the diisocyanate is reacted with the polyhydric alcohol at a temperature of 0° to 200° C., preferably 60° to 80° C., to avoid side reactions, it being noted that isocyanates can react with themselves at higher temperatures. The process can be carried out at a pressure from as low as 5 Torr to as high as 5 atmospheres, with atmospheric pressure being preferred. The mol ratio of diisocyanate to polyhydric alcohol is generally in the range of .6 to 1.1:1, preferably .8 to 1.1:1. Excessive amounts of isocyanate are undesired, since the isocyanate group remains reactive and tends to react with itself.

The polymerization process can be carried out with or without a catalyst. When carried out with a catalyst, it is preferred that the catalyst be a basic catalyst, especially where a basic catalyst may have been used in the preparation of the polyhydric alcohol and be retained in admixture with the polyhydric alcohol. Nitrogen-bearing polyhydric alcohol reactants tend to be autocatalytic, thereby making the use of additional catalyst unnecessary. Where a catalyst is present, it is preferred that the same be a tertiary amine, metal salt or inorganic acid and that the catalyst be present in an amount of between 0.01 and 1.0 weight percent.

Following the process, any solvent which may remain is distilled off or, if desired, the solvent can be retained if the same is one which is a component of lubricating oil or is compatible with lubricating oil or fuel. Preferably, where the polymerization process is carried out using a solvent, the solvent is one which is a component of the final lubricating oil component, such as a mineral oil, or is compatible therewith. It is to be understood, however, that the use of solvents to effect the polymerization process is unnecessary. The desired product can be recovered free of a suitably volatile catalyst by subjecting the catalyst, if present, to heat and/or reduced pressure. Triethylamine, if employed as catalyst, can be readily boiled off from a polymerization reaction product containing the same.

The polyhydric alcohols useful in accordance with the invention can be formed by initially forming a backbone component bearing the nitrogen atom in the form of an amine or amido group. To this end, an alkyl or alkenylsuccinic acid anhydride compound can be reacted with the compound whose formula is H—X—H, the reaction beind carried out at a temperature of 0° to 200° C., preferably room temperature to 120° C. The reaction can be carried out at a pressure from 5 Torr to 5 atmospheres, with atmospheric pressure being preferred. This reaction can also take place with or without the presence of a catalyst. If carried out in the presence of a catalyst, a base or acid catalyst can be employed. Preferably, the catalyst is a tertiary amine, such as triethylamine. The catalyst is employed in an amount of up to 20 mol percent. The reaction is effected for a period of time of between 15 minutes and 5 hours, preferably between 30 minutes and 2 hours.

The compound whose formula is H—X—H is present in a molar amount, relative to the anhydride reactant, of between 0.4 and 0.6 mols, preferably 0.5 mols, per mol of anhydride reactant. It is to be understood that the compound H—X—H should be one wherein the X moiety itself terminates in oxygen, nitrogen, or sulfur atoms. Thus, the hydrogen atoms of the compound H—X—H can be the hydrogen atoms from hydroxyl groups, the hydrogen atoms from amino groups, or the hydrogen atoms from thiol groups. The important consideration is that the compound fall within one of the classes set forth above.

The reaction is virtually stoichiometric and can be carried out in the presence or absence of a solvent. Where a solvent is employed, it is preferred that the solvent be an oil diluent or an inert hydrocarbon solution or an ether or chlorohydrocarbon. This reaction product need not be recovered, but can be converted into the dihydric alcohol by use of a hydroxyalkylating agent. Alternatively, any solvent present can be separated from the reaction product by distillation.

By reaction of the anhydride bearing the pendant alkyl or alkenyl group with the compound whose formula is H—X—H, there is formed a backbone compound which can be readily hydroxyalkylated to form a polyhydric alcohol useful in the formation of a polyurethane in accordance with the invention. Useful hydroxyalkylating agents include furans, oxetanes, epoxides, formaldehyde, dioxolanes, cyclic acetals or ketals, halohydroxyorgano compounds, such as those of the formula $HalR^{26}OH$ where $R^{26}$ is an alkyl group, especially one of 2 to 30 carbon atoms, formaldehyde under appropriate conditions, and compounds of the formula

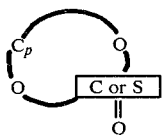

where p=2 or 3.

Where a compound of the formula

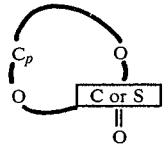

where p=2 or 3 is employed, the same is employed under conditions wherein carbon dioxide or sulfur dioxide is given off during the process. Generally speaking, the hydroxyalkylation is carried out using a mol ratio of hydroxyalkylating agent to the anhydride—H—X—H product in the range of 1.6 to 2.4:1, especially 2:1. The process can be carried out under a wide variety of conditions depending particularly upon the nature of the hydroxyalkylating agent. Generally, the process can be carried out at a pressure of as low as 5 Torr to as high as 5 atmospheres with elevated pressure being employed if the hydroxyalkylating agent is a gas.

In conducting the process, it is preferred that the hydroxyalkylating agent not be present in substantial excess, i.e., substantially above the 2.4:1 value set forth above, since at higher relative quantities of hydroxyalkylating agents, the hydroxyalkylating agent may react with traces of water to form an oil-insoluble polyether which is less than desirable, bearing in mind that the resultant reaction product is to subsequently be reacted with the diisocyanate.

The hydroxyalkylation can be carried out in the presence or absence of a catalyst. If a catalyst is present, it is preferred that the same be a tertiary amine. If haloalkenols are employed as hydroxyalkylating agent, a basic reactant, such as a tertiary amine or a metal base, should be present in the reaction mixture, or the acid groups of the intermediate anhydride—diol reaction product should first be converted by reaction with an amine or metal base to form a salt.

A set forth above, the dihydric alcohols are formed by initial reaction of an anhydride with a nitrogen-containing compound, representable by the formula H—X—H, followed by hydroxyalkylation of the resultant product. The basic anhydride preferably contains a pendant alkyl or alkenyl group such as derived from a polybutene, polypropylene or ethylene/propylene copolymer whereby the resultant pendant group from the anhydride function has 12 to 500 carbon atoms, preferably between about 20 and 200 carbon atoms, such group being in the form of an alkyl or alkenyl group. Particularly contemplated anhydride reactants are those obtained by the alkenylation of maleic acid anhydride resulting in the formation of an alkenyl succinic acid anhydride.

In order to more fully illustrate the nature of the invention and the manner of practicing the same, the following examples are presented:

EXAMPLES

EXAMPLE 1 Tolylenediisocyanate Reaction Product with the Bis-Hydroxyethyl Ester of Piperazine-Bis-Alkenylsuccinamic Acid

EXAMPLE 1-a Preparation of Bis-Succinamic Acid Intermediate 515 grams (0.3 mol) of a polybutenylsuccinic acid anhydride (prepared from approximately 1250 molecular weight polybutene) was dissolved in 528 grams of a diluent oil (100 E Pale Stock HF) at 60° C. and 12.9 grams (0.15 mols) of piperazine were added with stirring. The mixture was heated to 110° C. and stirred for 2 hours. Analysis revealed that the intermediate product had essentially no residual basic nitrogen and was essentially the desired bis-acid. The product contained approximately 0.40 weight percent nitrogen, corresponding to a theoretical nitrogen content of 0.38, a total acid number of 22 (theoretical total acid number 16) and a total base number of 3 (theoretical base number 0).

EXAMPLE 1-b Hydroxyethylation of the Bis-Acid of Example 1-a

A mixture of 690 grams (approximately 0.098 mol) of the intermediate formed in accordance with Example 1-a and 1.0 gram of triethylamine catalyst were heated to 110° C. under a nitrogen sweep. Ethylene oxide was added at 0.1 mol per hour for 2⅔ hours. The addition of ethylene oxide was then terminated and most of the unreacted ethylene oxide was then consumed by reaction at reflux over a period of ½ hour. After another ½ hour of nitrogen sweep to eliminate a minor excess of ethylene oxide, the weight gain of the product was 10.0 grams (as against 8.8 grams theoretical). The product was then stripped to 130° C. at 10 mm to remove catalyst. The product was analyzed and found to have a 0.39 weight percent nitrogen content with a total acid number of 2.1, indicating that the bis-hydroxyethyl ester was essentially free of unreacted acid groups.

EXAMPLE 1- c Polymerization by Reaction with a Diisocyanate

A 178.2 gram (0.025 mol) quantity of intermediate prepared in accordance with Example 1-b was heated to 80° C. and 4.70 grams (0.027 mol) tolylene-2,4-diisocyanate was added dropwise. After heating the mixture for 3 hours at 80° C., an infrared spectrum of the resultant reaction mass indicated the absence of unreacted diisocyanate. The product was filtered and stripped at 10 mm Hg to 130° C. The nitrogen content of the resultant product was 0.75 weight percent, as against a theoretical value of 0.77 weight percent.

EXAMPLE 2 Tolylene Diisocyanate Reaction Product with the Bis-Hydroxyethyl Ester of Bis-(Cyanoethyl) ethylenediamine Bis Alkenylsuccinamic Acid In the manner of Example 1, another polyurethane product was obtained, except that in the procedure of stage b the reaction was carried out at 120° C. employing 3 grams of triethylamine catalyst. The same was not stripped out following stage b. The crude step b product was used in step c for reaction with a diiosocyante. The materials charged in accordance with Example 2 were 423.2 g (0.2 mol) of the same alkenylsuccinic acid anhydride, 376.6 g of diluent oil, 16.6 g (0.1 mol) of N,N'-bis-(cyanoethyl) ethylenediamine (in place of the piperazine reactant in accordance with Example 1-a) and 17.9 g (0.103 mol) of tolylene-2,4-diisocyanate. In stage b, the ethylene oxide was added at a rate of 0.133 mol per hour over a period of 1¾ hours resulting in a weight gain of 10 grams (as against a calculated theoretical weight gain of 8.8 grams). The intermediate product from step b had a nitrogen content of 0.63 weight percent (0.72 weight percent calculated) and a total acid number of 0.43, indicating the same to be essentially neutral. The product following reaction with the diisocyanate contained 0.97 nitrogen as against a theoretical value of 1.00 weight percent nitrogen.

EXAMPLE 3 Tolylene Diisocyanate Reaction Product of the Hydroxyethyl Ester of the Bis (Alkenyl-Succinic Half-Acid, Half-Ester) of N,N-Bis-Hydroxyethyl Piperazine In the manner of Example 2, except that no catalyst was employed in step b, a polyurethane was obtained. The materials employed were 423.2 grams (0.2 mol) of the same alkenylsuccinic anhydride employed in Examples 1 and 2, 398.6 grams diluent oil, 17.4 grams (01. mol) 1,4-bis-hydroxyethyl piperazine (instead of the N,N'-bis-(cyanoethyl) ethylenediamine) and 17.4 grams (01. mol) tolylene-2,4-diisocyanate. The ethylene oxide uptake in step b was 9.3 grams (8.8 grams calculated). The product resultant from stage b had a nitrogen content of 0.31 weight percent (0.33 weight percent calculated) and a total acid number of 0.32. The final product from the third stage of the procedure had a nitrogen content of 0.61 weight percent (0.66 calculated).

EXAMPLE 4 Tolylenediisocyanate Reaction Product of Hydroxyethylated Polyamide of Piperazine and Alkenylsuccinic Acid Anhydride

EXAMPLE 4-a Preparation of Polyamide 216 grams (1.0 mol) of the alkenylsuccinic acid anhydride employed in Example 1 were dissolved in 2105 grams diluent oil at 60° C. and 86 grams (1.0 mol) of piperazine were added. The mixture was heated under a nitrogen blanket to 177° C. and the reaction was continued for 5 hours, eliminating water of reaction. The intermediate polyamide of nitrogen content 0.63 weight percent (0.67 weight percent calculated) had a total acid number of 6.2 and a total base number of 7.6. Thus, end group analysis indicated that the product was an oligomeric polyamide having an average of 4.3 repeating units.

EXAMPLE 4-b Hydroxyethylation of the End Groups of the Polyamide of Example 4-a A catalytic amount of triethylamine (0.5 grams) was added to 203.3 grams (0.05 equivalence of NH and COOH groups) of the polyamide prepared in accordance with Example 4-a and the mixture was heated to 120° C. Ethylene oxide was added at a rate of 0.05 mol per hour for a period of 2½ hours and the product was stripped substantially free of catalyst at 130° C. at a pressure of 10 mm Hg. Ethylene oxide uptake was 0.90 grams (0.02 mol). The product had a nitrogen content of 0.63 weight percent (0.65 calculated), a total acid number of 0.9 and a total base number of 2.6.

EXAMPLE 4-c Preparation of Polyurethane by Reaction with Tolylenediisocyanate 140 grams (approximately equal to 0.03 equivalence of end-groups) of the hydroxyethylated polyamide prepared in accordance with Example 4-b were heated to 80° C. and 2.80 grams (0.015 mol) of tolylene-2,4-diisocyanate were added. The reaction was conducted at 80° C. for 3 hours and for an additional 3 hours at 100° C. to complete the reaction of isocyanate. The product was filtered at 100° C. and stripped of catalyst at 130° C. at a pressure of 10 mm Hg. The product had a nitrogen content of 0.94 weight percent (0.93 weight percent calculated) and a total acid number of 0.15.

The products of Examples 1 through 4 were tested to determine their ability to act as an effective dispersant in a lubricating oil composition. In some instances, the intermediates from stages a and b were also tested to determine the extent to which the intermediate products were effective dispersants for lubricating oils. The respective products were evaluated at different concentrations (6.0 and 7.2 weight percent) in accordance with the Bench VC Test, which has been found to reliably predict the performance of a lubricating oil in engine testing. A Bench VC Test (BVCT) rating of 0 to 10 indicates the ability of the dispersant to pass the rigorous standards imposed by this test. A rating of 20 to 100 is indicative of the oil's increasingly poor dispersancy. The Test was conducted by heating a test oil mixed with a synthetic hydrocarbon blowby at a fixed temperature for a fixed time period. Upon heating, the turbidity of the resultant mixture was measured.

In Table I below, there is set forth the relative efficacy of the products as dispersants in a multi-grade motor oil formulation. These oils were formulated to contain, in addition to the dispersant, the following conventional additives: an overbased calcium sulfonate at 0.23 weight percent calcium, a zinc dialkyldithiophosphate at 0.15 weight percent zinc, an alkylated arylamine at 0.25 weight percent, an ethoxylated nonylphenol at 0.135 weight percent, a viscosity index improver, a pour point depressant, blended into a solvent neutral base oil.

TABLE I
DISPERSANCY TESTS ON EXAMPLES OF COMPOSITIONS OF THIS INVENTION

| Subject Dispersant Additive | | Oil Formulation Containing Subject Dispersant at | |
|---|---|---|---|
| Ex. No. | Rx Stage | 6.0 Percent | 7.2 Percent |
| 1 | b | 30 | 18.5 |
| 1 | c | 5.0 | 4.5, 2.0 |
| 2 | a | 31.0 | 17.0 |
| 2 | b | 52.0 | 47.0 |
| 2 | c | 4.0 | 2.5 |
| 3 | c | 8.5 | 3.5 |
| 4 | a | 11.0 | 8.0 |
| 4 | b | 12.5 | 8.0 |
| 4 | a | 10.0 | 7.0 |
| 4 | c | 4.5 | 4.0 | sulted in improving the dispersancy to a point where the same is useful in an engine. Thus, it is only by appropriate selection of backbone polyol and conversion of the same to corresponding polyurethane that a commercially suitable dispersant for a lubricating oil or fuel is provided.

To determine the effect of other, and perhaps related, precursors, a second series of compounds was provided. These compounds represent the tolylene diisocyanate reaction products of the chemical precursors set forth in Table II below. The compounds listed in Table II were prepared by essentially the same procedures described in Example 1, steps a, b and c, supra, using the indicated reactant in place of piperazine. The nitrogen analysis and infrared spectra (no isocyanate) were used to show that the desired products had been prepared.

TABLE II
RELATED TOLYLENEDIISOCYANATE REACTION PRODUCTS FOR COMPARISON TO COMPOSITIONS OF THIS INVENTION

| Ex. No. | Reactant Subst. for Piperazine in Example 1 | Structure of Intermediate Used in Diisocyanate Reaction | Percent N in Final Product | |
|---|---|---|---|---|
| | | | Found | Calc. |
| 5 | Ethylene glycol | 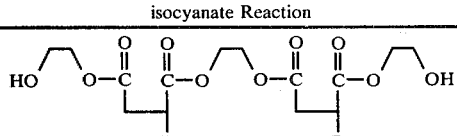 | 0.38 | 0.34 |
| 6 | Di-n-butylamine | 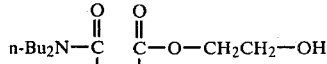 | 0.67 | 0.68 |
| 7 | Ethanolamine | 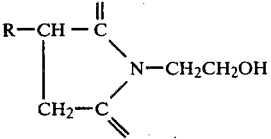 | 0.62 | 0.66 |
| 8 | (Piperazine) | 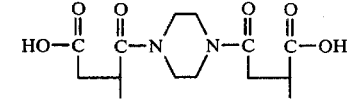 | 0.68 | 0.69 |
| 9[a] | Ethylenediamine | 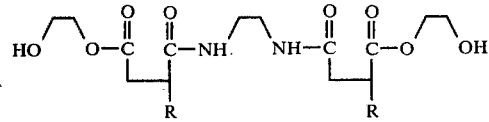 | 0.66 | 0.66 |

[a]Steps a and b were run at 60° C. to avoid cyclization of the amic acid to an unreactive imide. Step c was run at 60° C. for 3 hours and at 80° C. for 1 hour.

The data in Table I shows that the final diisocyanate reaction products (step c product of each example) are all very effective dispersants when tested in accordance with the Bench VC Dispersancy Test. The test data reveals that the product's precursors (the products of steps a and b) of Examples 1 through 3 are generally much less effective as dispersants.

Hence, it is only upon converting the polyhydric alcohol to a polyurethane polymer that the same becomes useful as a dispersant for a lubricant or fuel. This phenomenon could not have been predicted, particularly bearing in mind that the same amine or amido groups are present in the precursors of Examples a and b. In the case of Example 4, where the precursor was initially polymeric and possessed moderate dispersancy, the further polymerization induced by reaction of the hydroxyethylated end groups with the diisocyanate re- The five reaction products (following reaction with the diisocyanate) were evaluated in accordance with the Bench VC Dispersancy Test set forth supra to ascertain the criticality of the various structural features of the polymeric products of the invention. The dispersancy test evaluation of these preparations blended into the same motor oil noted supra is given in Table III below.

TABLE III
DISPERSANCY TESTS ON COMPARATIVE COMPOSITIONS

| Oil Formulation Containing Comparative Composition | | |
|---|---|---|
| of Example No. | at 6.0 percent | at 7.2 percent |
| 5 | 50.0 | 42.0 |
| 6 | 62.0 | 57.5 |
| 7 | 62.5 | 60.5 |
| 8 | 35.0 | 26.5 |

| TABLE III-continued |
| --- |
| DISPERSANCY TESTS ON COMPARATIVE COMPOSITIONS |

| Oil Formulation Containing Comparative Composition of Example No. | at 6.0 percent | at 7.2 percent |
| --- | --- | --- |
| 9 | 37.5 | 26.5 |

Since these preparations were grossly less effective than the final products of Examples 1c through 4c above, several conclusions were drawn. These conclusions are as follows:

A. The resultant polymer must have a nitrogen component (amido or amine group) other than the nitrogen of the urethane function—see Example 5 where the dihydric alcohol was free of an amine or amido group.

B. The polyurethane must have a polymeric structure see Examples 6 and 7 where, owing to the monofunctional nature of the alcohol, polymerization to greater than a bis-urethane was precluded.

C. The urethane function must be derived from an intermediate having alcohol functions and a diisocyanate. See Example 8 where the toluene diisocyanate was reacted with the hydroxyl groups of a dicarboxylic acid as opposed to the hydroxyl groups added by hydroxyalkylation, for example.

D. Preferably, there should be no secondary amide (—CO—NH—) functionality on the succinamic acid moiety. See Example 9 where the toluene diisocyanate was reacted with the hydroxyl groups of a hydroxy alkylated bis-succinamic acid which contained secondary amide groups. The results of dispersancy tests on Examples 1-c and 9 indicate that Example 9 was inferior to Example 1-c, owing to the fact that there were secondary amide functions on the succinamic acid moiety. It is assumed that the secondary amides underwent a side reaction to form alkenylsuccinimides, thus disallowing the ultimate formation of the polyurethane desired.

In the lubricating oil compositions containing the polyurethane detergent/dispersant of the invention, hydrocarbon mineral oil can be employed as the base material including oils of a paraffin base, naphthene base or mixed paraffin base distillate. Residual oils can also be present in the lubricating oil compositions of this invention. Paraffin base distillate lubricating oil fractions, as used in premium grade motor oils, are also contemplated for use in lubricating oil compositions of the invention. The lubricating mineral oil base generally is one which has been subjected to solvent refining to improve its lubricity and viscosity—temperature relationship. Such treatment can include solvent dewaxing to remove waxy components and to improve the pour of the oil. Broadly speaking, mineral lubricating oils for use in the mineral lubricating oil composition of the invention have a SUS viscosity at 100° F. between about 50 and 1,000. They preferably have a viscosity falling in the range of 70 to 300 at 100° F.

Synthetic lubricating bases of the ester or ether type can also be used as a lubricating base oil. High molecular weight, high boiling liquid aliphatic dicarboxylic esters and polyphenyl ethers possess excellent viscosity—temperature relationships and lubricating properties and are finding greater utilization in lubricating oils adapted for high and low temperature lubrications. Esters and ethers of this type are used in the formulation of jet engine oils. Specific examples of synthetic ester lubricating oils are those disclosed in U.S. Pat. No. 2,628,974 and U.S. Pat. No. 2,723,286.

What is claimed is:

1. A polyurethane which is the reaction product of an isocyanate and a diol of the formula

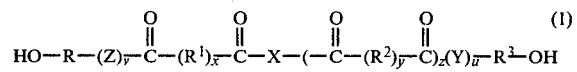

$$HO-R-(Z)_{\overline{u}}-\overset{O}{\overset{\|}{C}}-(R^1)_{\overline{x}}-\overset{O}{\overset{\|}{C}}-X-(-\overset{O}{\overset{\|}{C}}-(R^2)_{\overline{y}}-\overset{O}{\overset{\|}{C}})_{\overline{z}}(Y)_{\overline{v}}-R^3-OH \quad (I)$$

wherein
each of R, $R^1$, $R^2$ and $R^3$ is independently a divalent aliphatic or aromatic moiety;
u, v, x, y, and z are each independently 0 or 1 and x+y=1 or 2;
X is a radical derived from removal of terminal hydrogen atoms from a compound of the formula H—X—H wherein said H—X—H compound is:
 a. a diamine or polyamine bearing at least two secondary amino groups, optionally containing any number of tertiary amine or other functional groups inert to anhydrides, hydroxyalkylating agents and isocyanates;
 b. a monohydroxyalkyl secondary amine optionally bearing tertiary amine or other functions inert to anhydrides, hydroxyalkylating agents and isocyanates; or
 c. a bis-hydroxyalkyl substituted mono di-, or polytertiary amine; or
X is a -O-$R^4$-O moiety where $R^4$ is a $C_2$ to $C_{30}$ divalent hydrocarbyl group or an oxa-alkylene group of 1 to 15 oxygen atoms, and
Y and Z are each O or $NR^5$ where $R^5$ is a $C_1$ to $C_{30}$ alkyl group which can be substituted by aryloxy, cyano, $C_1$ to $C_{32}$ carbalkoxy, $C_1$ to $C_{32}$ carboxamido or other substituent inert to anhydrides, hydroxyalkylating agents and isocyanates.

2. A polyurethane according to claim 1 wherein said polyurethane has a molecular weight of between 1,000 and 30,000.

3. A polyurethane according to claim 2 wherein said polyurethane is soluble at room temperature in a lubricating oil in an amount of at least 0.5 weight percent.

4. A polyurethane according to claim 3 wherein said polyurethane is soluble at room temperature in a lubricating oil in an amount of between 0.5 and 15 weight percent.

5. A polyurethane according to claim 2 wherein there are at least two repeating polymeric units in said polyurethane.

6. A polyurethane according to claim 5 wherein there are 2 to 25 repeating polymeric units.

7. A polyurethane according to claim 6 wherein there are 5 to 12 repeating polymeric units.

8. A polyurethane according to claim 1 wherein R and $R^3$ are each independently a substituted or unsubstituted alkylene group of 2 to 30 carbon atoms and when substituted are substituted by any one of the following groups: cyano, tertiary amino, carbalkoxy or carboxamido.

9. A polyurethane according to claim 1 wherein x or y=1.

10. A polyurethane according to claim 1 wherein $R^1$ and $R^2$ are each independently an alkylene group of 2 to 30 carbon atoms or an arylene group of 6 to 16 carbocyclic carbon atoms either or both of which groups can be substituted and when substituted can be substituted with any of the following groups: $C_{12}$ to $C_{500}$ alkyl or alkenyl groups, which may themselves be unsubstituted or substituted with any one of the following groups: cyano, tertiary amino, carbalkoxy or carboxamido.

11. A polyurethane according to claim 1 wherein said compound H—X—H is an aromatic or heterocyclic secondary amine of 4 to 16 carbocyclic carbon atoms or an aliphatic secondary amine of 3 to 30 carbon atoms.

12. A polyurethane according to claim 11 wherein X is a divalent hydrocarbyl radical derived from an H—X—H compound bearing at least two secondary amino groups.

13. A polyurethane according to claim 11 wherein X is a divalent alkylene, alkenylene, alkynylene, cycloalkylene or cycloalkenylene group or a heterocyclic which can have 1 to 3 hetero atoms of the group nitrogen, oxygen and sulfur.

14. A polyurethane according to claim 11 wherein said compound X—X—H is selected from the group consisting of piperazine, an N,N'-bis-$C_1$ to $C_{30}$ alkyl, $C_2$ to $C_{30}$ alkylenediamines, an N,N'-bis-$C_1$ to $C_{30}$ alkyl-phenylenediamine and an N,N'-bis-cyanoethyl-$C_2$ to $C_{30}$ alkenylenediamine.

15. A polyurethane according to claim 1 wherein said compound H—X—H is a monohydroxyalkyl secondary amine of 2 to 30 carbon atoms in the alkyl group.

16. A polyurethane according to claim 15 wherein said secondary amine is one of the formula

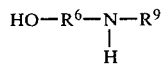

wherein
$R^6$ is a $C_2$ to $C_{30}$ alkylene group and $R^9$ is an alkyl group of 1 to 30 carbon atoms, an alkenyl group of 3 to 30 carbon atoms, an alkynyl group of 3 to 30 carbon atoms or an aryl group of 6 to 16 carbocyclic carbon atoms
which amine can be substituted by any one of the following substituents: cyano, tertiary amino, carbalkoxy or carboxamido.

17. A polyurethane according to claim 16 wherein said secondary amine is selected from the group consisting of N-alkyl-aminoethanols, N-cyanoalkyl-aminoethanols, N-carboalkoxy-alkyl-aminoethanols, N-alkoxyalkyl-aminoethanols, and similar N-substituted-aminopropanols, -aminobutanols, -aminohexanols, N-hydroxyalkylpiperazines, 2-hydroxyalkyl-N-alkylpiperazines, N-hydroxyalkyl-aniline, -toluidine, or -xylidines.

18. A polyurethane according to claim 1 wherein said compound H-X-H is a bis-hydroxyalkyl substituted mono-, di or poly-tertiary amine having 2 to 30 carbon atoms in the alkyl group, said tertiary amine being the tertiary amine of an aromatic or heterocyclic compound having 4 to 16 carbon atoms where if heterocyclic the hetero atom is oxygen, nitrogen, or sulfur or an alkyl, alkenyl or alkynyl compound containing 1 to 10 tertiary amine groups and 1 to 30 carbon atoms per nitrogen atom in the chain.

19. A polyurethane according to claim 18 wherein said tertiary amine is a tertiary amine of an aliphatic compound wherein the aliphatic portion of the molecule is a hydrocarbyl group.

20. A polyurethane according to claim 19 wherein said hydrocarbyl group is a monovalent alkyl, alkenyl or alkynyl group.

21. A polyurethane according to claim 18 wherein said bis-hydroxyalkyl substituted mono-, di- or poly-tertiary amine is a heterocyclic compound which in addition to any nitrogen atoms in the ring can contain an oxygen or sulfur as additional hetero atoms.

22. A polyurethane according to claim 18 wherein said bis-hydroxyalkyl substituted mono-, di- or poly-tertiary amine is selected from the group consisting of N-alkyl-imino-bis-alkanols, N-aryl-imino-bis-alkanols, N,N'-bis-hydroxyalkyl-piperazines, N', N''''-hydroxyalkyl-N'',N'''-alkylene-bis-piperazines, N', $N^\omega$-hydroxyalkyl-polyalkylene-poly-piperazines, N,N'-bis-hydroxyalkyl-N,N-bis-cyanoalkyl-alkylenediamines, N',$N^\omega$-N'' to $N^{\omega-1}$-polycyanoalkyl-poly-alkyleneimines, N,N'-bis-hydroxyalkyl, N,N'-dialkyl-alkylenediamines.

23. A polyurethane according to claim 1 wherein said compound H-X-H has the formula

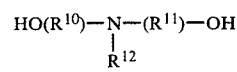

wherein
$R^{10}$ and $R^{11}$ are independently divalent hydrocarbyl groups of 2 to 30 carbon atoms; and
$R^{12}$ is an alkyl group of 1 to 30 carbon atoms or an aryl group having 6 to 16 carbocyclic carbon atoms.

24. A polyurethane according to claim 23 wherein $R^{10}$ and $R^{11}$ are alkylene groups and $R^{12}$ is a $C_1$ to $C_{30}$ alkyl group or an aryl group having 6 to 16 carbocyclic carbon atoms.

25. A polyurethane according to claim 1 wherein said compound H-X-H is a bis-hydroxyalkyl substituted mono-, di-or poly-tertiary amine of the formula

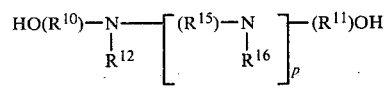

wherein
$R^{10}$, $R^{11}$ and $R^{15}$ are independently divalent hydrocarbyl groups of 2 to 30 carbon atoms;
$R^{12}$ is an alkyl group of 1 to 30 carbon atoms or an aryl group having 6 to 16 carboxyclic carbon atoms;
$R^{16}$ is an alkyl or aryl radical which can be substituted by any one of the functions cyano, tertiary amino, or carboxamido; and p=1 to 10 and $R^{12}$ may be the same or different in each repeating unit.

26. A polyurethane according to claim 1 wherein said isocyanate is a diisocyanate of the formula

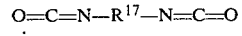

wherein
$R^{17}$ is arylene, polyarylene, arylene of at least two arylene nuclei where at least two arylene nuclei are linked together through alkylene, alkylidene, alkenylene groups or oxygen, nitrogen or sulfur atoms, mixed alkylene-arylene, alkylene and polyalkylenes as well as the thioanalogs of such diisocyanates.

27. A polyurethane according to claim 26 wherein $R^{17}$ has 6 to 16 carbocyclic carbon atoms in each arylene nucleus and 0 to 4 chain carbon atoms in each alkylene, alkylidene or alkenylene group.

28. A polyurethane according to claim 1 wherein said polyurethane has a recurring structural unit of the formula

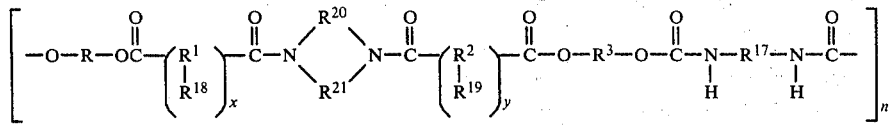

wherein
R, R¹, R², and R³ have the meanings given in claim 1;
x and y are 0 or 1 and x+y=1 or 2;
R¹⁷ is an arylene, polyarylene, arylene of at least two arylene nuclei where at least two arylene nuclei are linked together through an alkylene, alkylidene, or alkenylene group, oxygen, nitrogen or sulfur atom, mixed alkylene-arylene, alkylene and polyalkylene radicals as well as the thioanalogs of such diisocyanates;
R¹⁸ and R¹⁹ are each independently alkyl or alkenyl of 12 to 500 carbon atoms;
R²⁰ and R²¹ are each divalent aryl radicals of 6 to 16 carbocyclic carbon atoms or alkyl or alkenyl groups of 2 to 30 chain carbon atoms; and
n=2 to 30.

29. A polyurethane according to claim 28 wherein each of R¹⁸ and R¹⁹ is an alkyl or alkenyl group of 12 to 30 carbon atoms.

30. A polyurethane according to claim 1 wherein said polyol has the formula

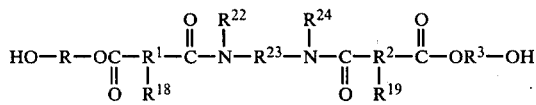

wherein
R, R¹, R² and R³ have the meanings given in claim 1;
R¹⁸ and R¹⁹ are C₁₂-C₅₀₀ alkyl or alkenyl groups;
R²² and R²⁴ are independently alkyl, alkoxyalkyl, aryloxyalkyl, cyanoalkyl, carboalkoxyalkyl, carboxamidoalkyl, or one of such groups substituted by a group inert to an anhydride, hydroxyalkylating agent or isocyanate; and
R²³ is a divalent alkylene, alkenylene or arylene group of 2 to 30 carbon atoms.

31. A polyurethane according to claim 1 wherein said polyol has the formula

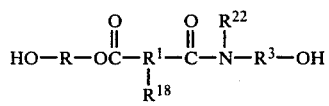

wherein
R, R¹ and R³ have the meanings given in claim 1;
R¹⁸ is a C₁₂ to C₅₀₀ alkyl or alkenyl group; and
R²² is an alkyl, tertiary aminoalkyl, cyanoalkyl, carboalkoxyalkyl, carboxamidoalkyl, or one of such groups substituted by a group inert to an anhydride, hydroxyalkylating agent or isocyanate.

32. A polyurethane according to claim 1 wherein said polyol has the formula

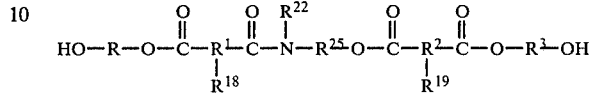

wherein
R, R¹, R², and R³ have the meanings given in claim 1;
R¹⁸ and R¹⁹ each independently represent a C₁₂ to C₅₀₀ alkyl or alkenyl group;
R²² is an alkyl, tertiary aminoalkyl, cyanoalkyl, carboalkoxyalkyl, carboxamidoalkyl, or one of such groups substituted by a group inert to an anhydride, hydroxyalkylating agent or isocyanate; and
R²⁵ is an alkylene or arylene moiety of 2 to 20 carbon atoms which can be substituted by a moiety inert to anhydrides, hydroxyalkylating agents and isocyanates.

33. A polyurethane according to claim 1 wherein said polyol has the formula

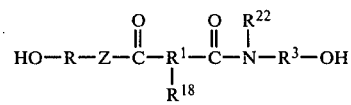

wherein
R, R¹, R³, and Z have the meanings given in claim 1;
R¹⁸ is a C₁₂ to C₅₀₀ alkyl or alkenyl group; and
R²² is an alkyl, tertiary aminoalkyl, cyanoalkyl, carboalkoxyalkyl, carboxamidoalkyl, or one of such groups substituted by a group inert to an anhydride, hydroxyalkylating agent or isocyanate.

34. A polyurethane according to claim 1 wherein said polyol has the formula

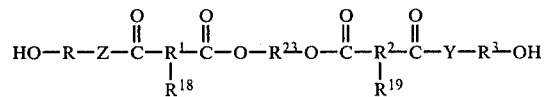

wherein
R, R¹, R², R³, Y and Z have the meanings given in claim 1;
R¹⁸ and R¹⁹ are each independently C₁₂ and C₅₀₀ alkyl or alkenyl groups; and
R²³ is a divalent alkylene, alkenylene or arylene group of 2 to 30 carbon atoms.

35. A lubricating oil composition comprising a lubricating oil and the polyurethane of claim 1.

36. A lubricating oil composition according to claim 35 wherein said polyurethane is present in an amount of 0.5 to 15 weight percent.

37. A lubricating oil composition according to claim 35 wherein said polyurethane is present in an amount of 40 to 60 weight percent.

38. A lubricating oil composition comprising a lubricating oil and the polyurethane of claim 30.

39. A lubricating oil composition comprising a lubricating oil and the polyurethane of claim 31.

40. A lubricating oil composition comprising a lubricating oil and the polyurethane of claim 32.

41. A lubricating oil composition comprising a lubricating oil and the polyurethane of claim 33.

42. A lubricating oil composition comprising a lubricating oil and the polyurethane of claim 34.

43. A lubricating oil composition comprising a lubricating oil and the polyurethane of claim 2.

44. A lubricating oil composition comprising a lubricating oil and the polyurethane of claim 28.

45. A fuel composition comprising a fuel and the polyurethane of claim 1.

46. A fuel composition according to claim 45 wherein said polyurethane is present in an amount between 0.0002 and 0.05 weight percent.

* * * * *